US006493208B1

United States Patent
Piché et al.

(10) Patent No.: US 6,493,208 B1
(45) Date of Patent: Dec. 10, 2002

(54) TRIPHENYL PHOSPHINE OXIDE POLYMER CAPACITORS

(75) Inventors: Joseph Piché, Raynham, MA (US); Patrick Mack, Milford, MA (US); Paul Glatkowski, Littleton, MA (US); Jeffrey Conroy, Rumford, RI (US); Paul Winsor, Somerset, MA (US)

(73) Assignee: Eikos, Inc., Franklin, MA (US)

( * ) Notice: Subject to any disclaimer, the term of this patent is extended or adjusted under 35 U.S.C. 154(b) by 0 days.

(21) Appl. No.: 09/716,240

(22) Filed: Nov. 21, 2000

Related U.S. Application Data

(63) Continuation-in-part of application No. 09/627,233, filed on Jul. 27, 2000, now abandoned.
(60) Provisional application No. 60/145,844, filed on Jul. 27, 1999.

(51) Int. Cl.$^7$ .................................................. H01G 4/06
(52) U.S. Cl. ..................... 361/311; 364/306.1; 364/328; 364/321.1
(58) Field of Search ............................. 361/311, 306.1, 361/328, 323, 286, 320, 321.1, 322, 505, 527, 327, 504

(56) References Cited

U.S. PATENT DOCUMENTS

| 4,237,194 A | * 12/1980 | Upson et al. | 428/424.2 |
| 4,435,475 A | * 3/1984 | Sasaki et al. | 428/409 |
| 5,134,207 A | 7/1992 | McGrath et al. | 525/537 |
| 5,387,629 A | 2/1995 | McGrath et al. | 524/190 |
| 5,407,528 A | * 4/1995 | McGrath et al. | 156/643 |
| 5,408,381 A | * 4/1995 | Thoma et al. | 361/286 |
| 5,691,442 A | 11/1997 | Unroe et al. | 528/125 |
| 5,739,193 A | * 4/1998 | Walpita et al. | 524/413 |
| 6,040,416 A | 3/2000 | Sekharipuram et al. | 528/168 |
| 6,121,495 A | * 9/2000 | Babb et al. | 568/17 |

FOREIGN PATENT DOCUMENTS

JP   05021284   * 1/1993

* cited by examiner

Primary Examiner—Dean A. Reichard
Assistant Examiner—Nguyen Ha
(74) Attorney, Agent, or Firm—Heller Ehrman White & McAuliffe LLP

(57) ABSTRACT

The present invention is a capacitor of a triphenyl phosphine oxide film as a base dielectric. More specifically, the base dielectric film is selected from the group consisting of Bisphenol-A (Bis-A PEPO). 4',4'-biphenol (BP-PEPO), and Hydroquinone (HQ-PEPO). TPPO based polymers have a very high breakdown strength, dielectric constant, low dissipation factor and high energy density. An ultra-thin coating can leverage the capabilities of this new dielectric, and potentially other commercial polymer films, to make possible energy storage in excess of 1 J/cc. The triphenyl phosphine oxide film can be fabricated containing a conducting PolyANiline (PAN) polymer layer located between the electrode and core polymer, or by being dip coated with PAN.

12 Claims, 2 Drawing Sheets

Dielectric breakdown strength of the three TPPO polymers and the control Mylar C

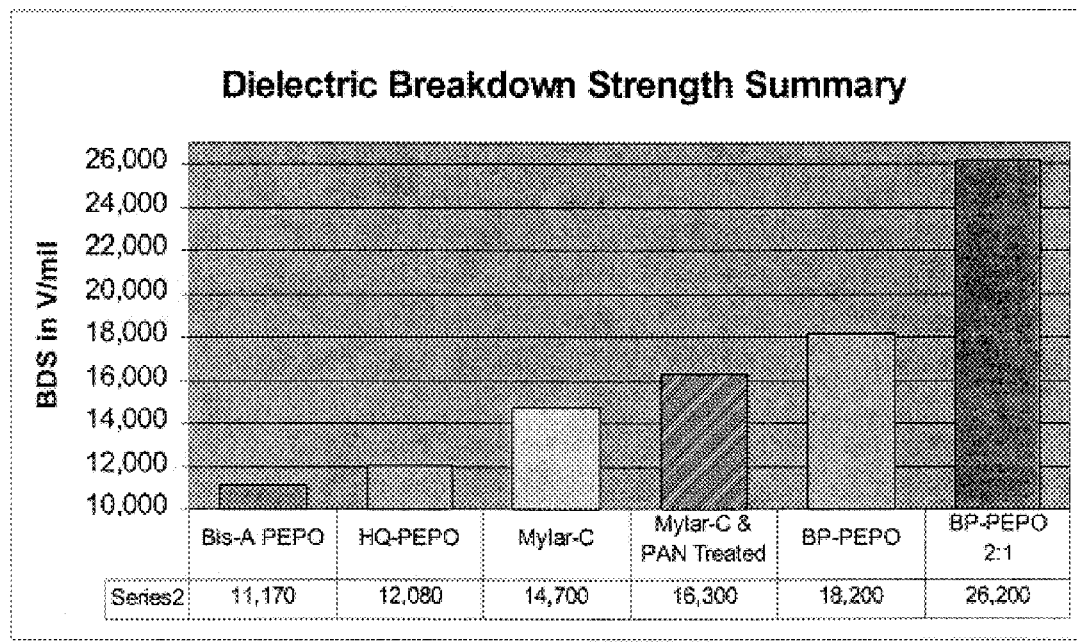
FIG. 1. Dielectric breakdown strength of the three TPPO polymers and the control Mylar C

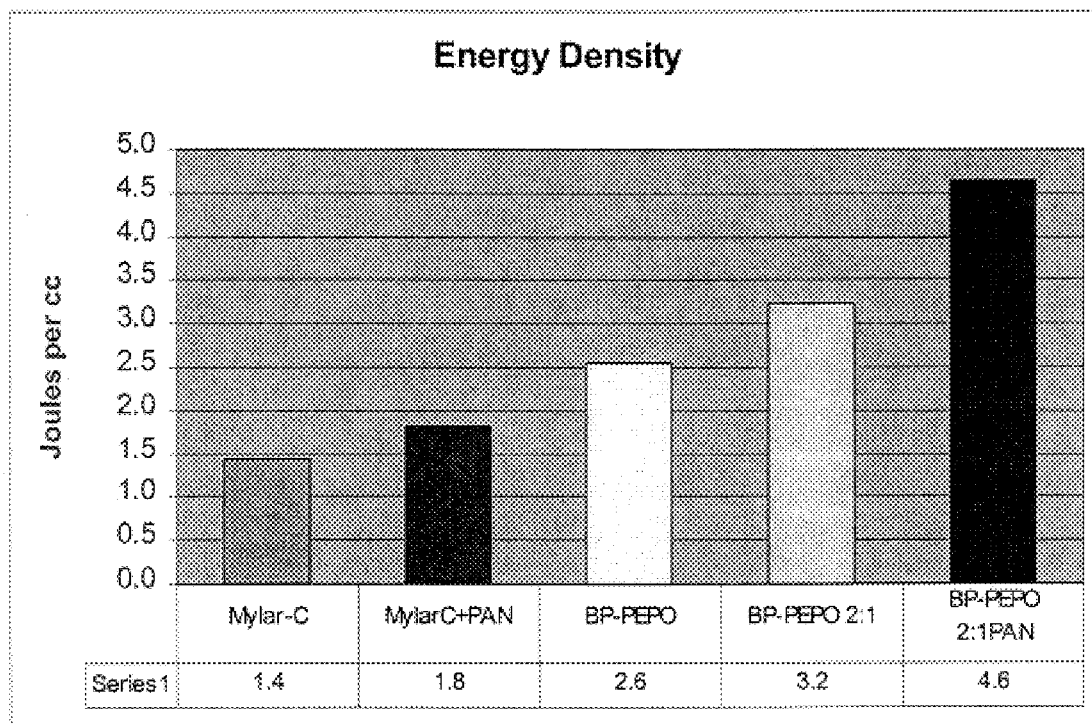
FIG.2: Capacitor energy density for the three TPPO polymers and the control Mylar C

TRIPHENYL PHOSPHINE OXIDE POLYMER CAPACITORS

REFERENCE TO RELATED APPLICATIONS

This patent application is a c.i.p. to U.S. Utility patent application entitled "Triphenyl Phosphine Oxide Polymer Based Capacitors," Ser. No. 09/627,233, filed Jul. 27, 2000 now abandoned, which claims priority to U.S. Provisional Patent Application entitled "Triphenyl Phosphine Oxide Polymer Based Capacitors," Ser. No. 60/145,844, filed Jul. 27, 1999 now abandoned. These applications are specifically incorporated herein by reference.

RIGHTS IN THE INVENTION

The invention was made with support from the United States government and the United States government has certain rights in this invention.

BACKGROUND OF THE INVENTION

1. Field of the Invention

The present invention relates to AB block co-polymers comprising, as the A component, a triphenyl phosphine oxide (TPPO) monomer and, as the B component, another monomer which may be the same or different, and to ultra-high density, low loss, thin film capacitors containing these AB block co-polymers.

2. Description of the Background

Metallized film capacitors are utilized in a broad range of electrical and electronic components. Various dielectrics and different structures make these products suitable for versatile applications in automotive and entertainment electronics, telecommunications, and industrial and medical electronics (see U.S. Pat. Nos. 5,691,442; 6,040,416; 5,387,629; and 5,134,207).

Metallized film capacitors are generally used to store energy. Some applications use capacitors to perform specific functions such as filtering, timing, and decoupling. The advantages of metallized film capacitors include high temperature operation, exceptional stability, low power loss, close tolerance, long life, high reliability, and lower volume, cost, and weight.

Many different kinds of polymer film capacitors exist which are identified by the dielectric material that is used in their construction. Common dielectric materials used to make polymer film capacitors include polycarbonate, polyester, polypropylene, polystyrene and polysulfone. The use of these polymers allows for advanced electronic packaging techniques, resulting in improved system performance and reliability.

These conventional polymeric materials, however, have several disadvantages as a dielectric film material, including a great decrease in dielectric properties in a humid atmosphere, film forming difficulties, small dielectric constants, small energy storage density, and instability at increasingly high temperatures.

In conventional capacitors, the dielectric material exists in the form of thick layers which must be self-supporting and thick enough to sustain the necessary operating voltage and physical handling. The large thickness of the polymer sheets in this case reduces the energy storage density of the capacitors. In conventional capacitors which employ a polymer sheet as the dielectric material, the layer of dielectric material typically has a thickness of at least 3–6 microns. Because the ability of a capacitor to store energy is inversely proportional to the thickness of a dielectric material, reduction of the thickness of the base film is required to improve capacitance of the capacitor. Conventional polymer films cannot satisfy the requirement for the reduction of film thickness sufficiently, because a very thin film has poor workability or processability in the production step of capacitors.

In addition to the current need for thin film capacitors, persons skilled in the art are faced with many manufacturing limitations. The polymeric materials must satisfy a number of critical thermal, environmental, and electrical requirements to meet the required performance criteria for microelectronics applications. These desired attributes include thermal stability, low moisture uptake, high breakdown voltage, low dielectric constant, low loss tangent, low leakage current, high glass transition temperature, and low surface roughness. When attempting to increase the energy density, the dielectric constant and breakdown voltages should remain fixed due to fixed polymer chemistries. If the voltage of the capacitor is raised above the corona inception voltage, rapid degradation of the dielectrics can occur. Dielectric degradation by thermal loads and electrostrictive forces can occur in high voltage rates, e.g., dV/dt, and high rep-rate pulse applications.

Thus, a need currently exists in the art for ultra-high density low loss thin film dielectric polymers. A material with a high dielectric constant that is stable at high voltages and temperatures is needed.

SUMMARY OF THE INVENTION

The present invention relates to capacitors comprising AB block co-polymers and other polymers. Particularly, the present invention relates to ultra-high density, low loss, thin film capacitors containing AB block co-polymers comprising, as the A component, a triphenyl phosphine oxide (TPPO) monomer and, as the B component, another monomer which may be the same or different. Such capacitors provide a novel film capacitor free from the disadvantages and problems in existing film capacitors.

According to an embodiment of the invention, a capacitor comprises a triphenyl phosphine oxide film as a base dielectric film, wherein the triphenyl phosphine oxide film is fabricated containing a conducting PolyANiline(PAN) polymer layer located between the electrode and core polymer. The said triphenyl phosphine oxide film is stretched either bi-axially or uni-axially.

In another embodiment of the invention, a capacitor comprises a base dielectric, wherein said base dielectric is an A-B block co-polymer comprising a triphenyl phosphine oxide (TPPO) or TPPO derivative A block and a monomer B block, wherein the monomer B block is selected from a group consisting of Bisphenol-A (Bis-A PEPO), 4,4'-biphenol (BP-PEPO), and Hydroquinone (HQ-PEPO). The TPPO derivative comprises a moiety attached to a phenyl ring opposite to a P=O bond in said TPPO. Alternatively, the moiety is either an electron withdrawing moiety or an electron donating moiety. The electron withdrawing moiety is selected from a group consisting of F, Cl, CN, and NO. The electron donating moiety is selected from a group consisting of $OCH_3$, $CH_3$, and $NHR_2$.

Other embodiments and advantages of the invention are set forth, in part, in the description which follows, and, in part, will be obvious from this description and may be learned from the practice of the invention.

DESCRIPTION OF THE DRAWINGS

FIG. 1 is a bar chart illustration of the dielectric breakdown strength of the three TPPO polymers and a control Mylar C.

FIG. 2 is a bar chart illustration of the capacitor energy density for the three TPPO polymers and a control Mylar C.

DESCRIPTION OF THE INVENTION

As embodied and broadly described herein, the present invention is directed to a capacitor comprising a triphenyl phosphine oxide film as a base dielectric film. More specifically, the base dielectric film comprises an AB block co-polymer selected from the group consisting of Bisphenol-A (Bis-A PEPO), 4,4'-biphenol (BP-PEPO), and Hydroquinone (HQ-PEPO). Accordingly, the present invention provides a novel film capacitor free from the disadvantages and problems in existing film capacitors resulting from their use as materials for dielectric films.

In an embodiment of the invention, an AB block co-polymer is composed of two monomers, i.e., an A monomer and a B monomer, joined together to give separate regions of nearly pure A and pure B component. The A component is a triphenyl phosphine oxide monomer. The B component is another monomer which may be the same as the A component or different.

As described above, the essential feature of the film capacitor of the present invention is that the dielectric film is formed from triphenyl phosphine oxide monomers and derivatives that are triphenyl phosphine oxide derivatives of one ring phenyl only, as further detailed in the following paragraphs. TPPO based polymers have a very high breakdown strength, dielectric constant, and low dissipation factor. An ultra-thin coating can leverage the capabilities of this new dielectric, and other commercial polymer films, to make possible energy storage in excess of 1 J/cc.

This approach to higher energy densities is accomplished without the power inefficiencies characteristic of PVDF, electrolytic, ceramic, and particle filled capacitors. TPPO polymers are readily processed by traditional thermoplastic techniques, such as extrudate blown film and by film casting from solutions, thereby leading to rapid insertion into commercial production lines and, therefore, production of extremely large capacitance devices. This class of polymers lends itself to easy modification for greater enhancement of properties.

In alternative embodiments, derivatives of the TPPO monomer, e.g., attaching moieties to the phenyl ring opposite to the P=O bond, can be used as the A or B component. One of ordinary skill can attach an electron withdrawing moiety, for example, F, Cl, CN, or NO, or electron donating moiety, for example, $OCH_3$, $CH_3$, or NHR2, to the phenyl ring(A) or to the other monomer(B).

In an embodiment of the invention, a capacitor contains these AB block co-polymers in the base dielectric film. Preferably, a polyphosphine oxide (PEPO) polymer, for example, Bisphenol-A (Bis-A PEPO), 4,4'-biphenol (BP-PEPO), and Hydroquinone (HQ-PEPO), is selected for use in the dielectric AB block co-polymer. The A block comprises a triphenyl phosphine oxide (TPPO) unit that contributes to both high dielectric constant and high thermal stability of the result monomer. The B block comprises the dihydroxy molecule (Bis-A, BP, and HQ). All three derivatives of TPPO monomers, Bis-A-TPPO, BP-TPPO and HQ-TPPO, can be synthesized, purified, formed into films following a synthetic procedure presented in U.S. Pat. No. 5,691,441 (Unroe).

In general, all starting compounds are combined in a glass reactor and dissolved in dimethyl acetamide (DMAC) at room temperature. While stirring the mixture, potassium carbonate and toluene is added and then heated to 140° C. for approximately 8 hours while water is removed through a Dean-Stark trap. All of the toluene is then distilled over a 5-hour period until the temperature reaches 155° C. After 12 hours at 155° C., contents are cooled to 25 ° C. and precipitated into a methanol water mixture. In an embodiment of the invention, the polymer solution is prepared and cast into films using THF, Cholorform, and Methylene Chloride as casting solvents.

Casting solutions are made to provide thin (<25 microns) and thicker (25–100 microns) films. Very consistent films are produced using 1% wt./vol. and 4% wt./vol. solutions. Once the solutions are cast onto a dish and the dish is covered, drying for 1 to 12 hours is required. Once dry, the dish is placed in a water bath, to float the film from the glass surface, then transferred to a paper towel for drying in a 110° C. oven. The film is then stretched at approximately 220° C. Alternatively, other manufacturing techniques for thin films can be used.

Capacitors are fabricated containing a conducting PolyANiline (PAN) polymer layer located between the electrode and core polymer. Furthermore, x-TPPO films are prepared by dip coating with PAN. These specially prepared films are coated with a 0.05–0.1 m thick layer of conductive polyaniline. A thin coating can be obtained by dipping tenterframed films into a dispersion of polyaniline and drying.

The following experiments are offered to illustrate embodiments of the invention and should not be viewed as limiting the scope of the invention.

Example 1

Dielectric testing

Dielectric testing was performed on the three TPPO polymers synthesized and prepared as described above. The dielectric constant was calculated using the measured values of capacitance (C), thickness (T) and electrode area (A) and by applying the following classic equation for capacitance:

$$C = \varepsilon_o \kappa_d (A/T), \text{ where } \varepsilon_o = 8.854 \times 10^{-12} \text{f/m}$$

Solving for $K_d$ gives; $\kappa_d = (C\,T)/(\varepsilon_o A)$

A precision micrometer was used to determine the thickness. The electrode diameter was measured using a hand held micrometer. All capacitance and dissipation measurements were performed using a Stanford Research Systems LCR meter (model SR715).

The characterization of these films consists of measuring dielectric constant (k is calculated from thickness and capacitance), and dissipation factor (DF) at several frequencies (120 Hz, 1 kHz, and 10 kHz). The dielectric constant and DF was characterized for all three films and the Mylar-C control films at room temperature and elevated temperatures up to 150 C.

The results of the capacitance testing for the three experimental films is presented in Table 1. The data shown in Table 1 represents the summary of hundreds of dielectric measurements on the samples and the control. Note that all the PEPO polymers have a higher dielectric constant than Mylar and excellent dissipation factor at high frequencies.

Example 2

Breakdown Strength Measurement Results

A high voltage breakdown testing apparatus consisted of a polycarbonate test cell, High Voltage DC power supply, chart recorder, and a digital voltmeter with voltage divider for monitoring the test conditions, as specified under ASTM D149. The test cells were designed for testing metallized and plain films. The apparatus was tested using Mylar-C film ranging from 0.06 mil to 1.00 mill thickness and with complete dielectric properties data. These films were also used for the conducting polymer electrode experiments. The trials with the Mylar films consistently reproduced the results documented in the data sheets.

TABLE 1

Results of capacitance testing for three experimental films

| | Bis-phenol-A (Bis-A PEPO) | 4,4'-biphenol (BP-PEPO) | Hydro-quinone (HQ-PEPO) | Mylar C |
|---|---|---|---|---|
| Measured thickness (mils) | 1.30 | 0.74 | 0.40 | 0.24 |
| d Thickness (meters) | 3.30E-05 | 1.88E-05 | 1.02E-05 | 6.10E-06 |
| Electrode Diameter (mm) | 12.5 | 12.5 | 12.5 | 12.5 |
| Area (m$^2$) | 1.56E-04 | 1.56E-04 | 1.56E-04 | 1.56E-04 |
| Capacitance Measured (pF) | 113 | 220 | 443 | 590 |
| Dielectric Constant | 3.51 | 3.89 | 4.23 | 3.38 |
| Dissipation Factor at 20° C. | | | | |
| 120 Hz | 0.0066 | 0.0090 | 0.0050 | 0.0049 |
| 1 kHz | 0.0072 | 0.0077 | 0.0073 | 0.0081 |
| 10 kHz | 0.0128 | 0.0130 | 0.0132 | 0.0200 |
| Breakdown Strength ASTM D149 @ 0.2 mil-isl (V/mil) \ | 11,170 | 18,200 | 12,080 | 14,700 |

Breakdown testing is a bulk material property that is dependent on test apparatus and conditions like humidity. Therefore, breakdown testing was performed in series on the same day, for all samples and control samples, to reduce day to day variability.

Capacitors were fabricated from both the "as delivered" Mylar-C films and those specially prepared by coating with a 0.05–0.1 m thick layer of conductive polyaniline. This thin coating was obtained by dipping tenter-framed films into a dispersion of polyaniline and drying.

Breakdown testing on Mylar C and conducting polymer coated Mylar C films was conducted with and without sputtered electrodes. In order to prevent damage to those with the gold top electrode, a thin smear of silver filled epoxy was placed over the center where the test probe contacts the sputtered electrode. This extra step will aid in preventing premature failure of the dielectric layer from mechanical damage during testing.

FIG. 1 is a bar chart illustration of the dielectric breakdown strength of the three TPPO polymers and the control Mylar C. The following notes will assist in interpreting this plot: all films were measured at the same thickness of 0.24 mils or 6 microns; the Mylar-C film is as delivered from DuPont and after treating with a 0.2 micron PolyANiline (PAN) conducting polymer layer between the gold electrode and the Mylar; the Biaxially Oriented PolyPropylene (BOPP) film is capacitor grade from Maxwell; the BP-TPPO 2:1 is the hand oriented uni-axial film. Note this is thinner than the other test film because of the stretching operation; and all testing was performed side by side with the Mylar, thereby providing a standard and reducing environmental and procedural effects, which may vary from day to day.

For a high energy density capacitor the dielectric constant, loss factor, and operational voltage all determine the end use and ultimate storage capacity. Of these three, operating voltage is the most important. The TPPO polymers have low loss factors and good dielectric constants. The operational voltage of a capacitor is limited by its minimal breakdown strength. The energy stored in a capacitor is calculated from the following expression:

$$W(j) = C \times V^2,$$

where W is in joules, C is capacitance in Farads, and V is Volts.

The ultimate energy storage in a capacitor varies by the square of the operating voltage, therefore doubling this voltage gives a four-fold increase in energy storage. However, doubling the capacitance, by doubling the dielectric constant, only gives a two-fold increase in energy storage.

Lastly, the energy density was calculated using the data above and that obtained from commercial film manufactures. FIG. 2 is a bar chart illustration of the capacitor energy density for the three TPPO polymers and the control Mylar C. The values were calculated using the following assumptions: metal electrodes are vacuum deposited to a 220 angstrom thickness; film thickness is 6.2 microns; applied voltage is 2000 volts for Mylar-C and for the other materials the voltage is proportional to breakdown strength of Mylar; the bars with cross hashed coloring are estimated values; the BP-TPPO 2:1 PAN is an estimate for a PAN treated biphenyl PEPO oriented film; the Tellurium TPPO value is an estimate derived from the computer modeling data; the BOHPPO-BFPPO value is an estimate derived from the computer modeling data. This polymer is a TPPO-TPPO or all triphenyl phosphine oxide polymer.

Other embodiments and uses of the invention will be apparent to those skilled in the art from consideration of the specification and practice of the invention disclosed herein. All documents referred to herein, including, but not limited to, all U.S. and foreign patent and patent applications, are specifically incorporated herein by reference. The specification and examples should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

What is claimed is:

1. A capacitor comprising
   a base dielectric, wherein said base dielectric is an A–B block co-polymer comprising a triphenyl phosphine oxide (TPPO) or TPPO derivative A block and a monomer B block.

2. The capacitor according to claim 1, wherein said monomer B block is selected from a group consisting of Bisphenol-A (Bis-A PEPO), 4,4'-biphenol (BP-PEPO), and Hydroquinone (HQ-PEPO).

3. The capacitor of claim 1 wherein said TPPO derivative comprises a moiety attached to a phenyl ring opposite to a P=O bond in said TPPO.

4. The capacitor of claim 3 wherein said moiety is an electron withdrawing moiety.

5. The capacitor of claim 4 wherein said electron withdrawing moiety is selected from a group consisting of F, Cl, CN, and NO.

6. The capacitor of claim 3 wherein said moiety is an electron donating moiety.

7. The capacitor of claim 6 wherein said electron donating moiety is selected from a group consisting of $OCH_3$, $CH_3$, and $NHR_2$.

8. The capacitor of claim 1 wherein said monomer B block comprises a triphenyl phosphine oxide (TPPO) or TPPO derivative.

9. The capacitor of claim 8 wherein said monomer B block comprises a dihydroxy molecule.

10. The capacitor of claim 1 further comprising a conducting PolyANiline polymer layer.

11. A capacitor comprising a triphenyl phosphine oxide film as a base dielectric film wherein said triphenyl phosphine oxide film is stretched either bi-axially or uni-axially.

12. The capacitor according to claim 11, wherein said triphenyl phosphine oxide film is fabricated containing a conducting PolyANiline(PAN) polymer layer located between an electrode and core polymer.

* * * * *